R. RAMSAY.
Car-Wheels.
No. 134,929.  Patented Jan. 14, 1873.
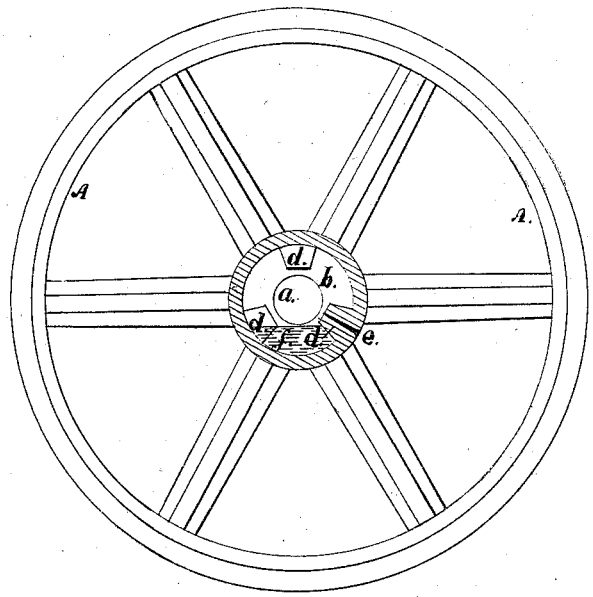
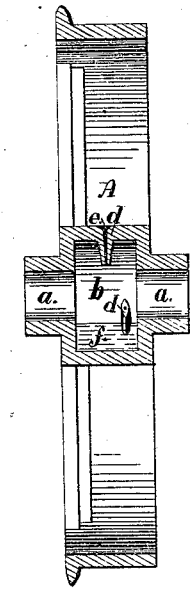
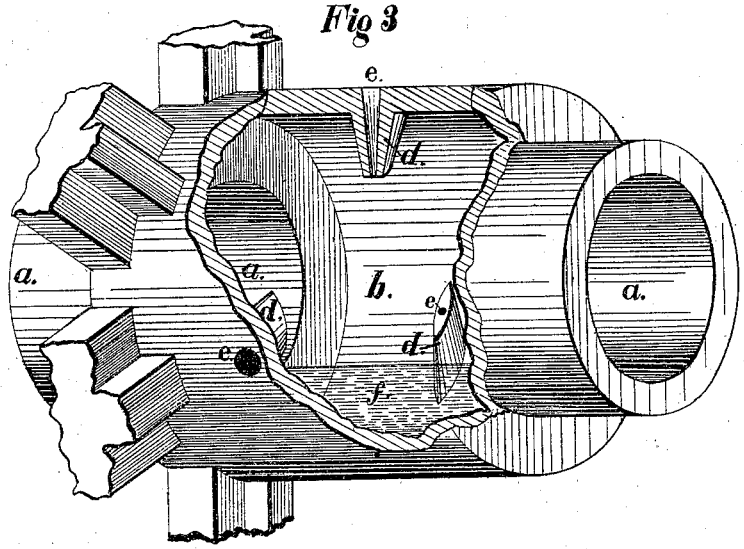
Witnesses:
Stanley Williams
Alex M. Prout Jr.
Inventor:
Robert Ramsay by
A M Stout his
attorney

UNITED STATES PATENT OFFICE.

ROBERT RAMSAY, OF IRWIN'S STATION, PENNSYLVANIA.

IMPROVEMENT IN CAR-WHEELS.

Specification forming part of Letters Patent No. 134,929, dated January 14, 1873.

*To all whom it may concern:*

Be it known that I, ROBERT RAMSAY, of Irwin's Station, in the county of Westmoreland and State of Pennsylvania, have invented certain Improvements in Car-Wheels, Pulleys, and the like revolving bearings for axles, journals and spindles, of which the following is a specification:

I will premise, generally, that my invention relates to the construction, combination, and arrangement of certain devices for the application of oil and other liquid substances to the axles, journals, and other revolving bearings in machinery, for the purpose of lubricating the same with thoroughness, economy in the use of the lubricating substance, and of time and attention.

The first part of my invention relates to the construction, in combination with the nipples hereinafter described, of a deep annular recess or chamber in the interior of a hub of a car-wheel or pulley surrounding its axle or journal, to contain a supply of any liquid lubricator; and the nipples before mentioned, at least three in number, are placed equidistant from each other, and should extend from the surface of the annular chamber in radial lines toward the center of the hub to points near the surface of the axle or journal, but not near enough to touch the same; and through these nipples and through the hub are made orifices or openings, tapering in their form from the outside of the hub to the points of the nipples. Through these orifices the oil is to be poured into the annular chamber, and they are made larger in their outer end to facilitate the pouring in, and smaller in their inner ends to prevent the return of the oil through them. There should be at least three in each hub and equidistant from each other, in order that the mouth of at least one of them shall always be higher than the chamber, to the end that oil at any time may be poured into it without turning the wheel or pulley, all of which will be more fully explained hereinafter. The second part of my invention relates to such an arrangement of the nipples in the chamber, with reference to the length of the hub, that when the wheel or pulley revolves the point of each will describe a circle around the axle on journal in a different plane from the others; and, further, to giving the nipples such outer form that while they are making their circuits they will cleave the body of the oil when they pass through it and carry as little as possible of it around with them; my design being that the body of the oil in the chamber shall not come in contact with the axle or journal, but that the nipples, as their points pass over it, shall drop upon it enough of the oil which shall adhere to their outer surfaces to lubricate it sufficiently, and no more; and by reason of the arrangement aforesaid each nipple will act as a dripper and lubricate its own belt around the axle. The third part of my invention relates to the construction of the nipple itself, hereinafter and hereinbefore described.

In the accompanying drawing, Figure 1 represents a side elevation of a car-wheel embracing my improvements, and a vertical section of the hub taken through the oil reservoir or chamber, so as to cut longitudinally one of the nipples. Fig. 2 represents a cross-section of the same; and Fig. 3 an enlarged view, in perspective, of the same, having the arms and a part of the hub broken away in order to illustrate more clearly my invention.

Although I have selected a car-wheel for illustration I do not, by any means, confine the application of my invention thereto, but extend it to any sort of machinery in which it can be used with advantage. The oil-chamber $b$ should be made long enough and deep enough to hold a sufficient quantity of oil for several days' use without the surface being raised high enough to come in contact with the axle, for in that case the axle would take up more oil than necessary, and then the excess would find its way out at each end of the hub and be wasted. Having introduced a supply of oil through any one of the nipples $e$, the mouth of which is upward, it will, by its own gravity, always remain in the section of the chamber that is nearest the ground, as in a cup, as shown in Fig. 3, and the nipple $d$ below and to the right in that figure, presenting a sharp edge to the liquid $f$, passes through without greatly agitating it and with being only partially submerged in it, and carries around with it the oil that adheres to its outer surface, and when it reaches the position occupied by the nipple in the top of that figure the oil drips from its point down upon the axle. The nipple, as shown, has two sharp edges, so that it acts equally well whether the wheel be turned backward or forward. The division of the circle of the inner surface of the chamber $b$ into three equal parts, to facilitate the introduction of oil, is shown in Fig. 1, and the arrangement of the nipples with respect to the length of the chamber, so that each shall lubricate its own belt around the axle, is shown fully in Fig. 3 and partially in Fig. 2. The size of the orifices in the nipples and the dimensions of the nipples themselves from front to rear, or from the right to the left, must be regulated with reference, of course, to the dimensions of the chamber and journal or axle.

What I claim as my invention, is—

1. The combination of the annular oil-chamber $b$ and the nipples $d\ d\ d$ provided with orifices for the introduction of oil, and arranged as described for that purpose, each constructed substantially as and for the purpose described.

2. The combination of the nipples $d\ d\ d$ having the outer form, and the orifices $e\ e\ e$ of the peculiar form described, and the arrangement described with reference to the length of the chamber $b$ and the said oil-chamber itself, substantially in the manner shown and described, and for the purpose set forth.

3. The nipples $d\ d\ d$, having the peculiar outer form and interior orifice $e$, substantially as shown and described, for the purpose set forth.

In testimony that I claim the foregoing I have hereunto set my hand.

ROBERT RAMSAY.

Witnesses:
HENRY BARNHART,
SILAS McCORMICK.